US009477669B2

(12) United States Patent
Pylappan et al.

(10) Patent No.: US 9,477,669 B2
(45) Date of Patent: Oct. 25, 2016

(54) INTEGRATING MESSAGING ATTACHMENTS WITH ONLINE PUBLISHING SYSTEMS

(75) Inventors: Seejo Pylappan, Cupertino, CA (US); Stephane Lunati, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1802 days.

(21) Appl. No.: 11/834,329

(22) Filed: Aug. 6, 2007

(65) Prior Publication Data

US 2009/0044131 A1    Feb. 12, 2009

(51) Int. Cl.
*G06F 3/00* (2006.01)
*G06F 17/30* (2006.01)

(52) U.S. Cl.
CPC .............................. *G06F 17/30058* (2013.01)

(58) Field of Classification Search
CPC .................................................... G06Q 30/02
USPC .................... 715/751, 200, 202, 752, 758
See application file for complete search history.

(56) References Cited

U.S. PATENT DOCUMENTS

| 7,343,168 | B2 * | 3/2008 | Valloppillil .................. 455/466 |
| 7,631,259 | B2 * | 12/2009 | Kirn ........................ H04L 12/58 |
| | | | 715/716 |
| 7,685,198 | B2 * | 3/2010 | Xu et al. ...................... 707/748 |
| 8,204,952 | B2 * | 6/2012 | Stremel et al. ............... 709/213 |
| 2006/0230061 | A1 * | 10/2006 | Sample et al. ........... 707/103 R |
| 2007/0294751 | A1 * | 12/2007 | Bellagamba et al. ........... 726/5 |
| 2008/0103906 | A1 * | 5/2008 | Singh ............................. 705/14 |
| 2008/0313287 | A1 * | 12/2008 | Wadsworth .......... G06Q 10/107 |
| | | | 709/206 |

OTHER PUBLICATIONS

David Mytton, Developing with the Facebook Platform and PHP, Jul. 11, 2007, sitepoint, pp. 1-25 (pdf).*
Screen shots of a "Save to Prolaw" feature showing the "Save to Prolaw Button" and including a popup that is rendered after the button is selected, 2 pages, printed on Aug. 6, 2007.

\* cited by examiner

*Primary Examiner* — Manglesh M Patel
(74) *Attorney, Agent, or Firm* — Blank Rome LLP

(57) ABSTRACT

A client publishes rich media content by receiving a message including a representation of imagery content. A publishing control is presented, in association with the message, that enables the user to transmit the imagery content to a publishing host. The user is enabled to interact with the publishing control and the representation of the imagery content to publish the imagery content using the publishing host.

38 Claims, 6 Drawing Sheets

INTEGRATING MESSAGING ATTACHMENTS WITH ONLINE PUBLISHING SYSTEMS

TECHNICAL FIELD

This disclosure relates to processing objects, such as images and movies, transmitted in connection with electronic messages, such as e-mail messages.

BACKGROUND

Users may exchange electronic messages with friends and family. These messages may include rich media content.

SUMMARY

In one general sense, a client publishes rich media content by receiving a message including a representation of imagery content. A publishing control is presented, in association with the message, that enables the user to transmit the imagery content to a publishing host. The user is enabled to interact with the publishing control and the representation of the imagery content to publish the imagery content using the publishing host.

Implementations may include one or more of the following features. For example, enabling the user to interact with the publishing control and the representation of the imagery content may include enabling the user to select a thumbnail of an image appearing in an electronic mail message and move the representation to a representation of a gallery associated with the user on a publishing host. Enabling the user to interact with the publishing control and the representation of the imagery content may includes enabling the user to interface with a first entity to access messages, and enabling the user to interface with a second entity to publish imagery content, the second entity being different than the first entity.

The user may be enabled to create a rule that automatically classifies the imagery content, associate a gallery with the rule, and automatically publish, in response to classifying the imagery content, the classified imagery content into the gallery.

The user may be enabled to create a rule that automatically classifies the imagery content, associate a gallery with the rule, determine that the imagery content in the message is responsive to the rule, present a suggestion control enabling the user to automatically publish the imagery content, and publish the imagery content in response to the user selecting the suggestion control. The suggestion control may be presented proximate to the representation of the imagery content.

Receiving the message may include receiving an electronic mail message, an instant message, or a Multimedia Messaging Service (MMS) message. A user may be enabled to publish non-imagery content.

In another general sense, rich media content may be published by enabling a user to access a message having associated imagery content, determining that the user has a publication capability on a publishing host, enabling the user to select a representation of the imagery content, and presenting, in association with the message, a publishing control that enables the user to transmit the imagery content to the publishing host. A user instruction may be received from a client to publish the selected representation on the publishing host. The imagery content is transmitted to the publishing host, and the publishing host may be instructed to enable other users to access the imagery content through a web browser. Implementations may include one or more of the following features. For example, presenting the publishing control may includes enabling the user to select a thumbnail of an image appearing in an electronic mail message and move the representation to a representation of a gallery associated with the user on a publishing host. Presenting the publishing control may include enabling the user to interface with a first entity to access messages, and enabling the user to interface with a second entity to publish imagery content, the second entity being different than the first entity.

Presenting the publishing control may include identifying a first gallery associated with the first entity, accessing permissions, associated with the user, for a publishing service operated the second entity, interfacing, based on accessing the permissions, with the publishing service, identifying a second gallery associated with the publishing service, presenting a first representation of the first gallery, presenting a second representation of the second gallery, enabling the user to perform a first operation to add the representation of the imagery content to the first gallery, and enabling the user to perform a second operation to add the representation of the imagery content to the second gallery, wherein the first and second operations are identical except for selection of the first gallery or the second gallery.

A rule may be accessed that automatically classifies the imagery content. A gallery may be associated with the rule. In response to classifying the imagery content, the classified imagery content is automatically published into the gallery.

A rule may be accessed that automatically classifies the imagery content. A gallery is associated with the rule, and it is determined that the imagery content in the message is responsive to the rule. A suggestion control is presented enabling the user to automatically publish the imagery content, and the imagery content is published in response to the user selecting the suggestion control. The suggestion control is presented proximate to the representation of the imagery content. Enabling the user to access the message may include presenting an electronic mail message, an instant message, or a Multimedia Messaging Service (MMS) message.

Determining that the user has a publication capability may include determining that a user identity for a messaging system also has permissions on a publishing host. Tags from the user may be suggested for the imagery content, and the content may be published with the suggested tags. Tags for the imagery content may be automatically suggested, and the content may be published with the suggested tags.

Implementations of any of the techniques described may include a method or process, an apparatus or system, or computer software on a computer-accessible medium

DESCRIPTION OF DRAWINGS

Like reference symbols in the various drawings indicate like elements.

DETAILED DESCRIPTION

This disclosure describes a system that integrates a messaging application (e.g., webmail system) with online publishing services used for hosting and sharing documents. For example, the documents may include photos or images (e.g., JPG, PNG, GIF, etc.), movies, or other kinds of rich media content that may be processed and transmitted to a selected online publishing services (e.g., Mac, Web Gallery, Flickr, Picasa, etc.). In this way, a user's friends and family may access the imagery content using a Web browser.

For example, a user may access a .Mac webmail account to read a message that includes one or more image or movie attachments. The webmail application may include a user interface that enables the user to transmit or publish an image or movie attached to a message on a publishing host. For instance, the user interface may be modified by displaying a menu or link, such as "Add to Web Gallery," whenever the application detects that image or movie attachments accompany the message. When the user clicks on or otherwise selects the "Add to Web Gallery" menu or link, an additional user interface (e.g., in a new window) may appear that lists all the "web galleries" that are available on the online service. In addition to listing the galleries, the user interface also may have a button or other such control that facilitates the creation of a brand new gallery.

The user interface also may show a thumbnail of each of the images and movies attached to the message, and provide a control that transmits (or copies) the corresponding attachment to an existing gallery offered by a publishing host. This operation could be done, for example, by using a check box next to each thumbnail and letting the user click on a button to copy the thumbnail to particular gallery. Alternatively, the operation could let the user simply select one or multiple thumbnails, then drag and drop them to the appropriate gallery. The user also may be provided with controls for adding a "caption" or "description" for the image or movie when it is published to the online service. When images and movies are added to the web gallery, the corresponding online service may automatically "refresh" its content, so that visitors viewing the web gallery may see the newly added images and movies.

Figure 1:
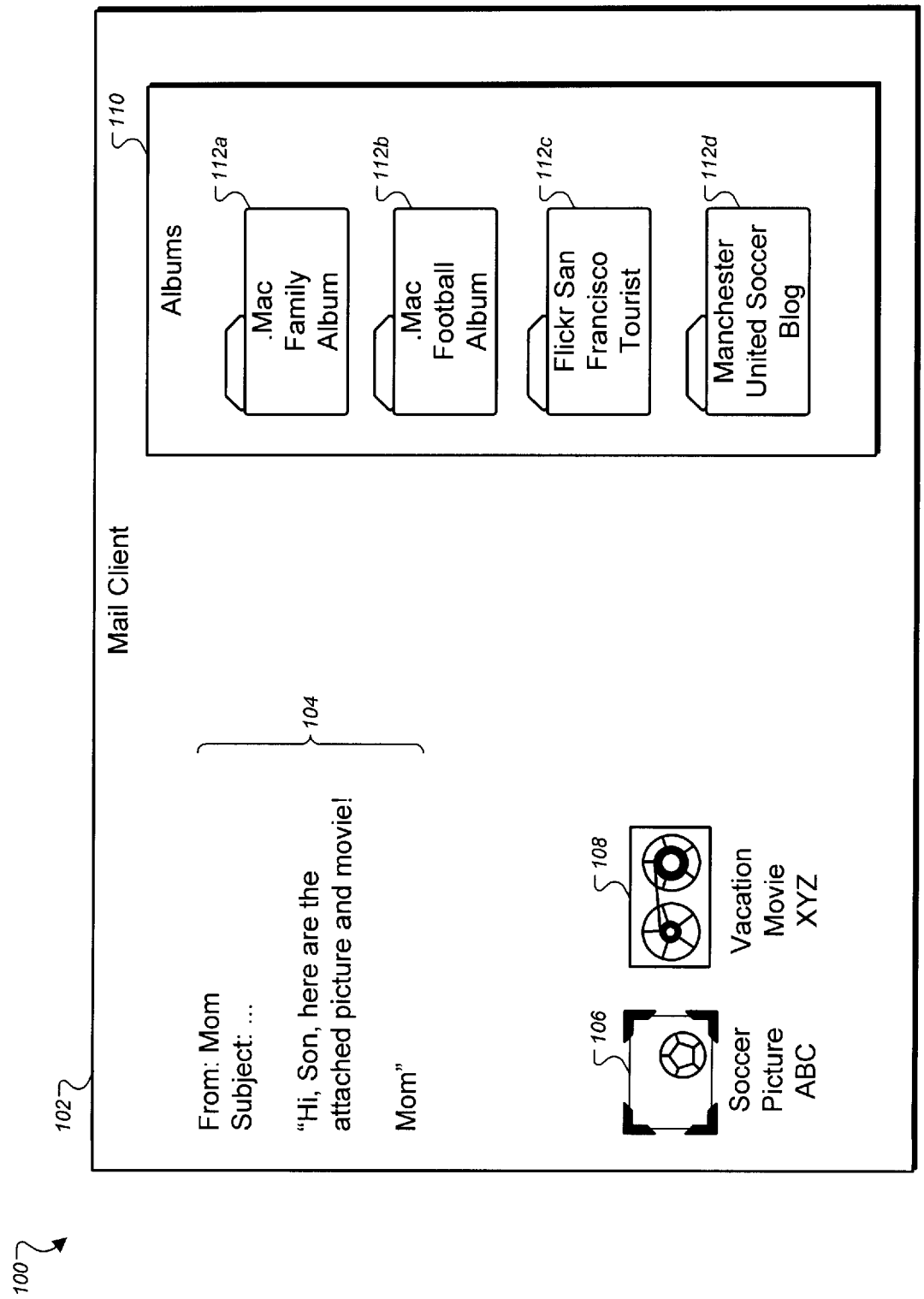
FIGS. 1-3 show examples of interfaces for receiving photo and movie attachments and publishing them to online albums.

FIG. 1 shows an example of an interface 100 for receiving photo and movie attachments and publishing them to online albums. As shown, a user is using a mail client application 102. The application 102 displays a mail message, such as message 104, that includes attachments 106 and 108. For instance, attachment 106 may include a soccer picture or photo (e.g., in JPG, PNG, GIF or some other format). Attachment 108 may represent a vacation movie or other media clip. Attachments, such as the attachments 106 and 108, may be represented in summary form, such as, for example, by using thumbnail display for photo attachment 106.

The mail client application 102 may include a control through which the user may publish or transmit attachments, such as soccer picture attachment 106 and vacation movie attachment 108, to albums 110 maintained by a publishing host (e.g., an album application running on a server that is configured to interface with a web server). In particular, the mail client application 102 may include publishing controls, such that the user may select how imagery content is published. Specifically, the albums may include several individual albums 112a-112d to which the user has access (e.g., the right to add pictures/movies to specific albums). In one implementation, the user may be able to select one or more of the attachments 106 and 108, then drag and drop them into a specific album. For example, if the user knows that the soccer picture attachment 106 is soccer-related, the user may drag the attachment 106 to the "Manchester United Soccer Blog" album 112d. Similarly, the user may drag the movie attachment 108 to the ".Mac Family Album" album 112a if the user knows that the movie is related to a recent family vacation.

In some implementations, other controls and user interfaces (not shown) may be included in the system 100 from which user instructions may be received. For example, the system 100 may include checkboxes next to the individual attachments. Using the check boxes, the user may be able to select several attachments for inclusion into a gallery. In some implementations, instead of using a drag and drop operation, the user may select the name of an existing gallery or album from a "drop down" menu.

The mail client 102 may include features that enable a user to track the progress of publishing attachments to online albums. For example, a hover display feature may identify albums to which a particular attachment has been moved. For instance, if the user positions and hovers the cursor over the attachment 106, the client 102 may display a message indicating that the picture attachment 106 has been "published" to the "Manchester United Soccer Blog" album 112d.

In some implementations, individual attachments may change in appearance after they have been published. For example, after publishing movie attachment 108 to the ".Mac Family Album" album 112a, the appearance of the attachment may change, such as by using a different color, or with bolding, and so on. In this way, the user may be able to quickly identify the attachments that have been published.

In still other implementations, hovering over a particular album 112a-112d may identify contents of that album. In addition, identification may include a specification of the particular attachments (e.g., attachments 106, 108) in the current message that have been published. For example, if the user hovers over the ".Mac Family Album" album 112a, a message may display "You've already published Picture 'ABC' to this album."

Figure 2:
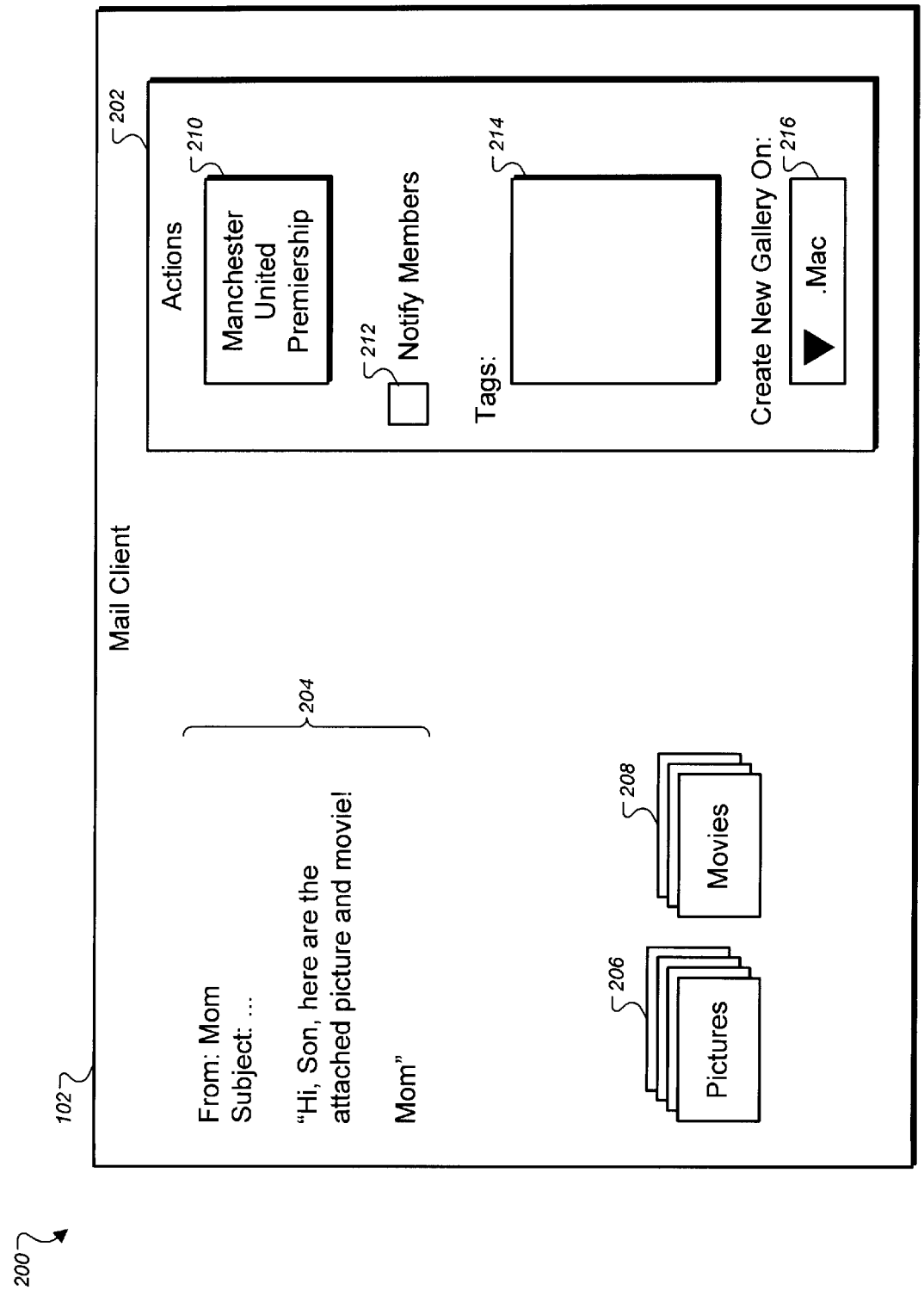

FIG. 2 shows an example of an interface 200 configured to enable a user to publish rich media content (e.g., photo and movie attachments) that has been received as attachments and/or embedded files. For instance, using the interface 200, the user may set up automatic notifications to subscribers or members of an online gallery (e.g., whenever content is added), tag photos or movies by adding descriptions or captions, and create new albums or galleries.

The interface 200 includes an actions area 202. The actions area 202 may be displayed, for example, whenever a user is publishing a photo or movie attachment for a message 204, such as one of the photo attachments 204 or movie attachments 206. The specific photo or movie attachment being published may be displayed or otherwise identified in a header 210, such as by including a thumbnail of the "Manchester United Premiership" photo.

The actions area 202 may include various controls. As depicted, the actions area 202 includes a "Notify Members" checkbox 212, a tags area 214, and a "Create New Gallery On:" control 216.

The "Notify Members" checkbox 212 may be checked by the user to automatically notify members or subscribers of a particular gallery that new content is available. For example, upon completion of the process of adding the Manchester Soccer Championship" photo attachment to a new gallery, the web publishing host may inform (e.g., by email) the members/subscribers that new content (e.g., a new photo) has been received. Subsequently, the members/subscribers may use a Web browser to access and view the new imagery content.

The tags area 214 may enable the user to specify tags associated with a particular image. For example, a tag may be a title, description or caption entered by the user that is published with the photo or movie. Such tags may provide additional information that may be used by members/subscribers web publishing host when viewing the imagery content. For example, an explanation accompanying a photo may provide insight regarding the subject of the photo, the camera settings used to take the photo, etc.

The user may use the "Create New Gallery On:" control 216 to select from available online publishing services (e.g., .Mac, Web Gallery, Flickr, Picasa, etc.). For example, the control 216 may enable the user to type in the name of an online publishing service or select one from a list. As depicted, the user has selected the ".Mac" online publishing service.

Other controls (now shown) also may be included with the system 200. For example, additional controls may provide the ability to adjust photos before they published online. Such controls may facilitate changes to a photo's orientation, resolution, color scale, brightness, etc. Other controls may enable the user to crop or edit individual photos.

Figure 3:
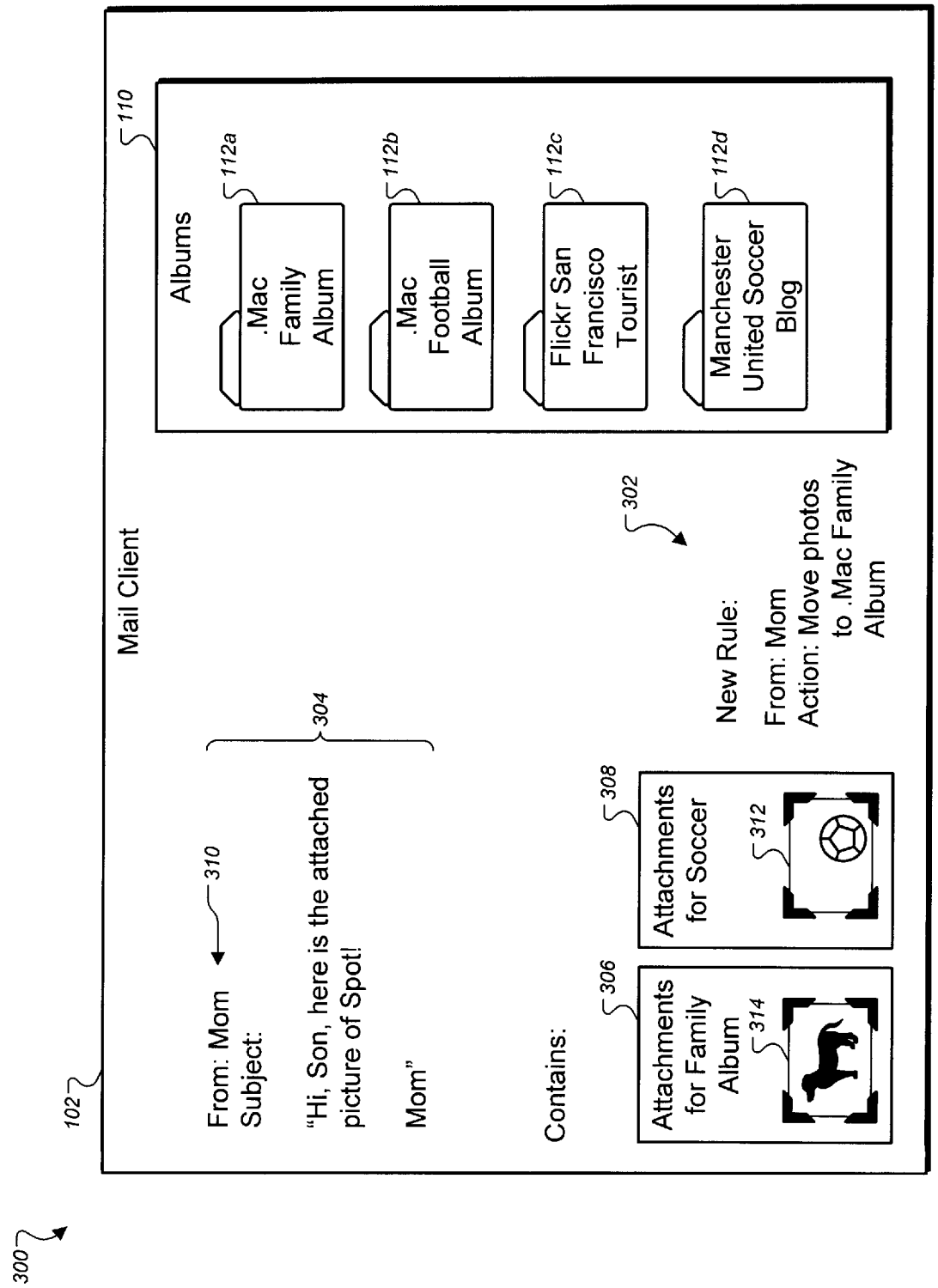

FIG. 3 shows an example of an interface 300 for receiving photo and movie attachments in a message and for using rules to that automatically categorize and/or publish the attachments to an online album offered by a publishing host. For instance, the mail client 102 may enable the user to define rules that may be used to automatically direct attachments to specific albums. In some implementations, several rules may be defined by a user. Such rules may be organized, for example, under an additional Rules window or other control (not shown). Each of the defined rules may have an identifier (e.g., a rule number) that may be referenced, for example, in messages displayed to the user.

In one example, the user may define a rule 302 that automatically publishes attachments to one or more specific albums. Specifically, rule 302 may be defined so that messages from Mom (e.g., defined in the rule by "From: Mom") are automatically moved to the ".Mac Family Album" album 112a (e.g., "Action: Moved photos to the Mac Family Album"). Such a rule, for example, may be invoked when a user receives message 304 from his mother that includes photo attachments 306 and 308. The rule in this case selects the message 304 because its "From" line 310 is "Mom."

Other rules may be configured to interface with image recognition components. For example, a user may define a rule that automatically publishes soccer-related photos to the "Manchester United Soccer Blog" album 112d. Specifically, an image recognition-based rule may be invoked in response to determining that the image 312 is soccer-related (e.g., because it includes a soccer ball in the image) and then automatically publish the corresponding attachment 308 to album 112d. The image-recognition based rule would not be invoked in response to analyzing attachment 306 because the corresponding image 314 with a dog does not include soccer-related imagery.

Other rules may be text-based. For example, the system may enable the user to define a rule such that messages with attachments matching certain keywords are published to particular albums. The key words may be used, for example, to match the subject of the mail message, or the file name of an attachment. For instance, if the subject of the message includes "San Francisco," an existing text-based rule may automatically publish the corresponding attachment to the "Flickr San Francisco Tourist" album 112c. In another example, if the name of an attachment includes "Football," a text-based rule may automatically publish the corresponding attachment to the ".Mac Football Album" album 112b.

In some implementations, if a user hovers over an attachment, information may be displayed that indicates the album to which the attachment was published and the rule used to effect the action. For example, if message attachment 306 has been automatically published to the ".Mac Family Album" album 112a, hovering over attachment 306 may display, "This attachment was published to '.Mac Family Album' using rule 29."

Figure 4:
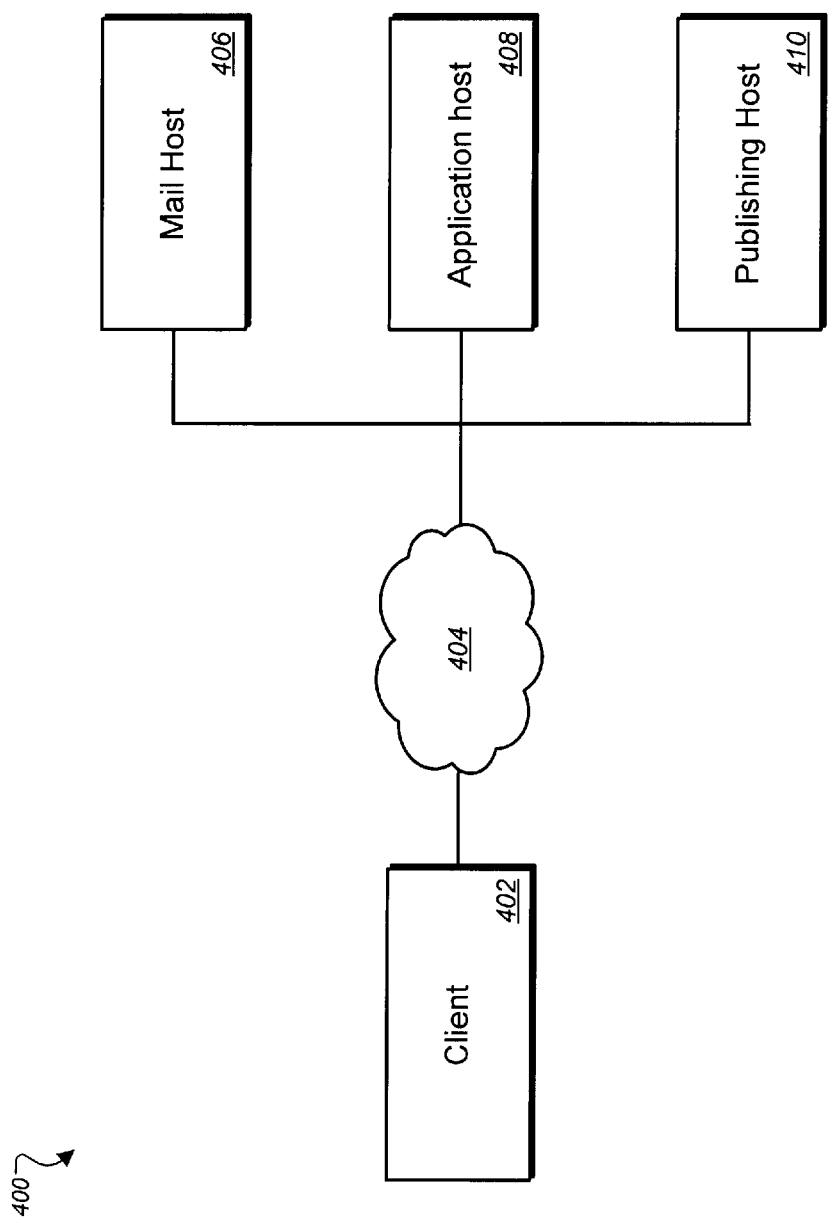
FIG. 4 shows an example of a communications network for integrating mail attachments with online publishing systems.

FIG. 4 shows an example of a communications network 400 that integrates messaging systems with publishing systems. The communications network 400 includes an application host 408, which a client 402 may access via a network 404. Communications network 400 also includes a mail host 406 and a publishing host 410 that also may be accessed by the client 402 via the network 404. A user at the client 402 may interface with the application host 408 to receive mail and mail attachments from the mail host 406 and to publish imagery content on the publishing host 410.

Generally, the client 402 includes a user's computer configured to interface with one or more hosts to exchange information. The client 402 may include a messaging application (e.g., MacOS X's Mail application or ichat). The client 402 also may include a browser (e.g., Apple's Safari™ browser). The browser may be configured to access an application host 408 to perceive messages through a web portal.

The network 404 typically includes hardware and/or software capable of enabling direct or indirect communications between the client 402 and the hosts (e.g., mail host 406). The network 404 may include a direct link between the client 402 and the hosts, or it may include one or more networks or subnetworks between them (not explicitly shown). Each network or subnetwork may include, for example, a wired or wireless data pathway capable of carrying and receiving data. Examples of network 404 include the Internet, the World Wide Web, a WAN ("Wide Area Network"), a LAN ("Local Area Network"), an analog or a digital wired and wireless telephone network (e.g., a PSTN ("Public Switched Telephone Network"), an ISDN ("Integrated Services Digital Network"), or a xDSL ("any form of Digital Subscriber Loop")), and/or a radio, television, cable, satellite, or any other delivery mechanism for carrying data.

The mail host 406 includes server systems configured to exchange messages and store messages for subsequent retrieval. The mail host may include an electronic mail messaging gateway that exchanges electronic mail messages with other hosts. The mail host 406 also may be configured to interface with a messaging client on client 402. For example, the client may include an iMac™ running MacOS X 10.4 with a mail application that interfaces with mail host 406 to present a messaging inbox.

The application host 408 may include the software application used for enabling a user to transmit imagery content to a publishing host. The application host 408 may first determine that the user has the authority to use the publishing host. As the user receives messages with attachments, the application host 408 may be configured to present controls that a user may use to select imagery content to be transmitted, add information about the imagery content before it is transmitted, and select the gallery in which to publish the imagery content. The application host 408 also may enable the user to control how members or subscribers are informed of newly published imagery content.

In some implementations, the application host 408 and the mail host 406 may represent different components of a larger integrated system. For example, if the mail host 406 enables access to Mac mail messages through a .Mac mail client, the mail host 406 may be configured to interface with the application host 408 to enable access to .Mac mail messages through a web browser on a client. The application host 408 may be configured to embed controls in the user interface(s) for publishing attachments.

In other implementations, the application host 408 may interface with other systems, such as third party messaging and publishing systems. For example, different systems may communicate using an established API (Application Programming Interface). In this way, the resources and features available on a first system may be accessed by a different system, for example, using the Internet.

In still other implementations, the application host 408 and the mail host 406 may be configured to share information in order to determine whether a message should be configured to include publishing controls. For example, when the client 402 is accessing a mail host 406 in order to access electronic mail messages, the mail host 406 mail interface with the application host 408 in order to decide whether a publishing control should be embedded within the message. In one example, the application host 408 may provide a list of albums or online galleries to which the user has access or is authorized to post rich media content.

The publishing host 410 includes a server system configured to enable access to content. For example, the publishing host may include a web server that provides accesses to imagery content through a browser. The publishing host 410 may be configured to interface with the application host 408 and/or mail host 406 to receive imagery content selected for publication by the user.

In one implementation, the software for publishing rich media content to the publishing host 410 may operate on the publishing host 410. For example, a menu or link, such as "Add to Web Gallery," may direct the user to a landing page on the publishing host 410. In this configuration, the application host 408 may serve as an intermediary between the mail host 406 and the publishing host 410. As such, the application host 408 (e.g., on behalf of the mail host 406) may forward to the publishing host 410 attachments to be published and instructions regarding how they should be published.

Figure 5:
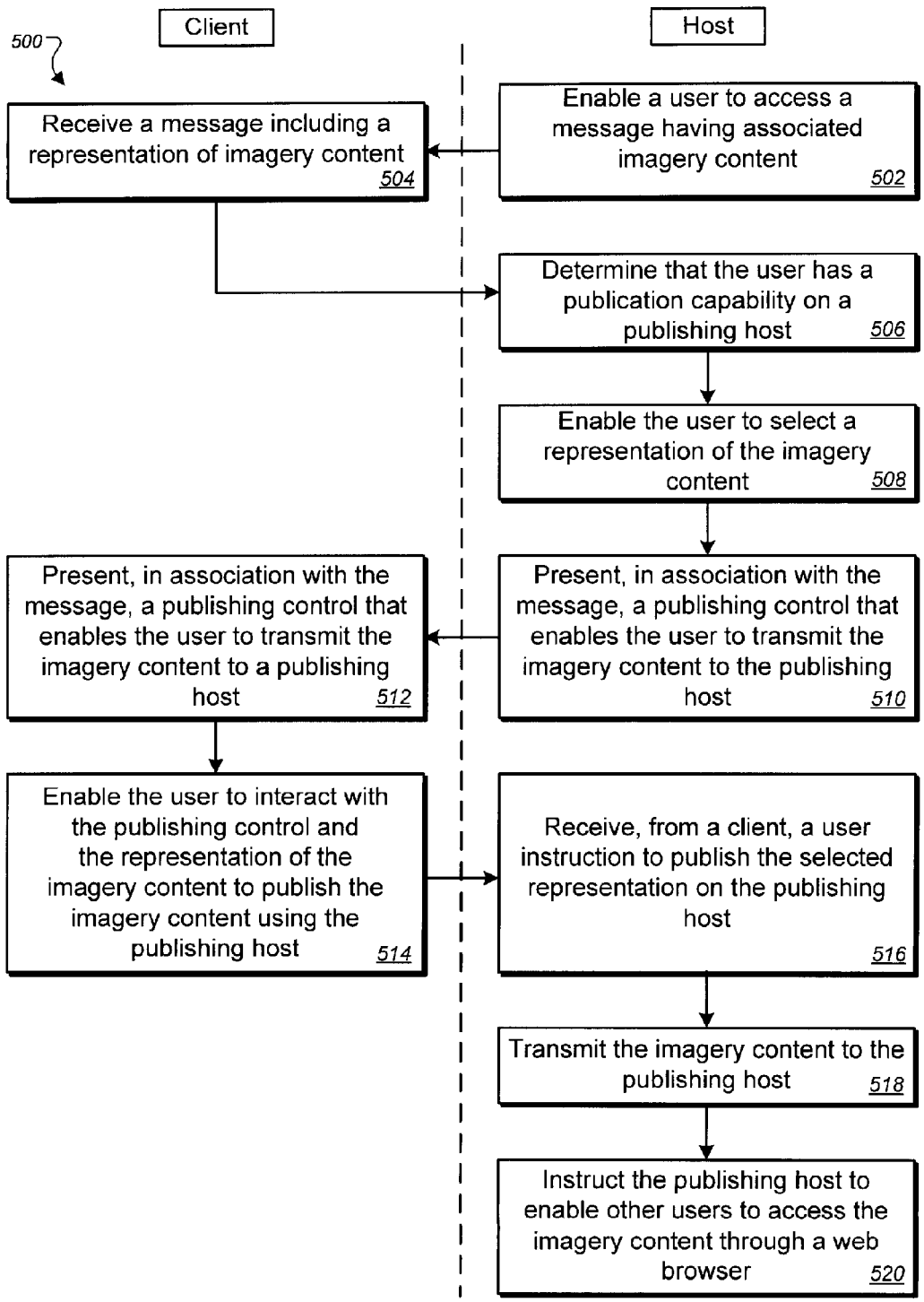
FIG. 5 depicts a flow chart 500 of an example of process for publishing rich media content.

FIG. 5 depicts a flow chart 500 of an example of a process for publishing rich media content. For example, the operations shown in flow chart 500 may be used in (or implemented as) application software, such as associated with an electronic mail messaging system. As shown, the operations in flow chart 500 are divided into client and server operations. However, the operations also may be performed on other systems, for example, by performing server operations on a client. Generally, a user may access a messaging application to receive messages with attachments that include rich media content, such as photos or movies. The user may interact with messaging controls to select imagery content for publication, add information about the imagery content before it is published/transmitted, and select the gallery in which to publish the imagery content. The server, in response, transmits the imagery content to selected galleries. Upon completion of transmission and publication, the server may notify subscribers/members of the galleries that the photos and movies may be accessed and viewed, for example, using a Web browser.

Initially, the host enables a user to access a message having associated imagery content (502). For example, an electronic mail server may provide the user access to various email messages received over the Internet. Some of the messages may have attachments that include rich media content. The client receives a message including a representation of imagery content (504). For example, referring to FIG. 1, the client may receive an email message 104 from his mom that includes attachments 106 and 108. In particular, attachment 106 may include a photo, and attachment 108 may include a movie.

The host determines that the user has a publication capability on a publishing host (506). For example, using the user's identification (e.g., email address or other such ID), the host may determine the publishing capabilities of the user. Such capabilities may include, for example, a list of online publishing services which the user is authorized to use, and the particular albums or galleries in which the user is allowed to post rich media content. Such galleries or albums may be displayed to the user, for example, in an albums area 110 of FIG. 1.

The host enables the user to select a representation of the imagery content (508). For example, the host may provide a thumbnail or other representation of the imagery content associated with the attachment. Specifically, thumbnails may be used to depict the imagery content of the attachments 106 and 108. In the case of a thumbnail used for the movie attachment 108, the thumbnail may include a title page of the movie, a selected scene from the movie, or a dynamic display that continuously alternates various scenes.

The host presents, in association with the message, a publishing control that enables the user to transmit the imagery content to the publishing host (510). For example, referring to FIG. 1, the publishing control may include a drag and drop interface that the user may use to drag and drop specific attachments to any of several albums 112a-112d on FIG. 1. Other publishing controls may enable the user to control certain aspects of the publication, such as member notification, creating tags, and selecting new galleries, as described above in reference to FIG. 2. Additional publishing controls may enable the user to designate rules for selecting and transmitting imagery content, as described above in reference to FIG. 3.

The client presents, in association with the message, a publishing control that enables the user to transmit the imagery content to a publishing host (512). For example, the client may control the user interface and accept user instruction to select attachments for transmission/publication to selected albums or galleries.

The host enables the user to interact with the imagery control and the representation of the imagery content to publish the imagery content using the publishing host (514). For example, the client may respond to user instruction in the form of a drag and drop operation with an attachment being moved onto a particular gallery or album.

As a result of the drag and drop operation performed on the client, the client may provide information to the server. The host receives, from a client, a user instruction to publish the selected representation on the publishing host (516). The host may receive a command resulting from the drag and drop operation on the photo attachment 106 to the "Manchester United Soccer Blog" album 112d.

The server transmits the imagery content to the publishing host (518). For example, in response to receiving the drag and drop operation on the photo attachment 106, the host may transmit the associated rich media content to the user-designated online publishing service (e.g., .Mac, Web Gallery, Flickr, Picasa, etc.), and the user-designated album or gallery in each application host The host instructs the publishing host to enable other users to access the imagery content through a web browser (520). For example, a publishing host may enable members or subscribers to access to the new content (e.g., the new photo in the "Manchester United Soccer Blog") once the new content has been received. In particular, the members or subscribers may use a Web browser to access and view the new imagery content. In addition, the publishing host may send a notification (e.g., via email) indicating that new imagery content is available if, for example, the user has checked the "Notify Members" checkbox 212 during the process of transmitting the photo.

Figure 6:
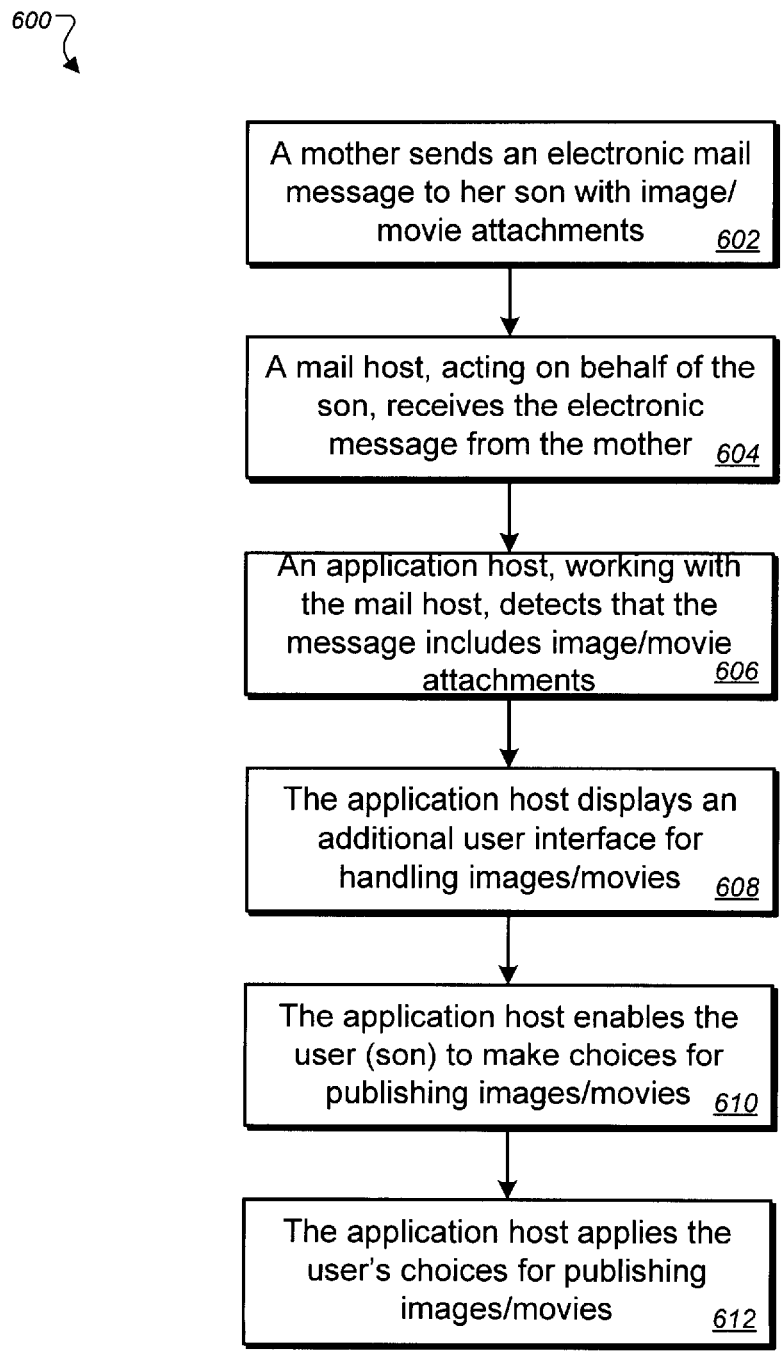
FIG. 6 depicts a flow chart 600 of a process in which a user receives imagery content and publishes the imagery content to an online publishing system.

FIG. 6 depicts a flow chart 600 of a process in which a user receives imagery content and publishes the imagery content to an online publishing system. As is shown in flow chart 600, a user's mother sends an electronic mail message to her son with image and/or movie attachments (602). For example, the email message may resemble the email message 104 described above with respect to FIG. 1. Specifically, the email message may include attachments, such as photo attachment 106 and movie attachment 108. A mail host, acting on behalf of the son, receives the electronic mail message from his mom (604). The mail host may include an SMTP ("Simple Mail Transfer Protocol") gateway configured to process inbound electronic mail messages.

An application host, working with the mail host, detects that the message includes image/movie attachments (606). For example, an application host may interface with the mail host to enable access to electronic mail messages through a web browser. The application host may detect that attachments are included with the email message, and that the attachments include rich media content (e.g., as opposed to text documents, spreadsheets, etc.) Such determination may be made, for example, by examining the filename suffixes of the attachments (e.g., JPG, PNG, GIF, etc.) and associating these with photos, etc.

The application host displays an additional user interface for handling images and movies (608). For example, the system (e.g., using the mail client application 102) may display user controls the 102, such as a representation (e.g., thumbnail) of the attachment and user controls for selecting attachments to be transmitted to user-specified albums or galleries. Additional user interfaces may enable the user to perform operations on such attachments. FIGS. 1-3 depict various user controls and user interfaces for handling image and movie attachments.

The application host enables the user (son) to make choices for publishing images/movies (610). For example, referring to FIG. 1, the user may select attachments 106 and 108 to transmit to any of the albums 112*a*-112*d*. Referring to FIG. 2, the user may use the "Notify Members" checkbox 212, input tags using the tags area 214, and select a new gallery using the "Create New Gallery On:" control 216. Referring to FIG. 3, the user may set up rules for automatically handling attachments that include rich media content.

The application host applies the user's choices for publishing images/movies (612). For example, based on user instructions, the application host may transmit the imagery content identified by the user to the corresponding online publishing service (e.g., Mac, Web Gallery, Flickr, Picasa, etc.), and the user-designated album or gallery in each.

The processes and logic flows described in this specification may be performed by one or more programmable processors executing one or more computer programs to perform functions by operating on input data and generating output. The processes and logic flows also may be performed by, and apparatus also may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of a digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may include other forms of sensory feedback, e.g., visual feedback, auditory feedback, or tactile feedback; and input from the user may be received in other forms, including acoustic, speech, near-touch input, or tactile input.

Implementations of the subject matter described in this specification may be implemented in a computing system that includes a back-end component, e.g., as a data server, or that includes a middleware component, e.g., an application host, or that includes a front-end component, e.g., a client computer having a graphical user interface or a Web browser through which a user may interact with an implementation of the subject matter described is this specification, or other integration of one or more such back-end, middleware, or front-end components. The components of the system may be interconnected by forms or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification includes many specifics, these should not be construed as limitations on the scope of the disclosure or of what may be claimed, but rather as descriptions of features specific to particular implementations of the disclosure. Certain features that are described in this specification in the context of separate implementations also may be implemented in combination in a single implementation. Conversely, various features that are described in the context of a single implementation also may be implemented in multiple implementations separately or in sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. Other implementations are within the scope of the following claims. For example, although various operations and systems referred to electronic mail messages, other types of messaging may be used. In one configuration, a wireless phone may be configured to process MMS ("Multimedia Messaging Service") messages and publish images embedded therein. In another configuration, an instant messaging host may be configured to process images embedded within instant messages.

Although some implementations were described with respect to imagery content, such as pictures and video, other implementations may enable other types of document to be published. For example, a user may publish an audio file, brochure or presentation.

What is claimed is:

1. A method for publishing rich media content, the method comprising:
   receiving, on a receiving client, an electronic message from a messaging client that comprises a representation of imagery content, wherein the electronic message is transported via a messaging host that provides communication independently from a publishing host;
   obtaining, by the receiving client, a publishing control associated with the electronic message after checking that the receiving client has publishing capabilities on the publication host, wherein the publishing control enables transmission of the imagery content to the publishing host;
   displaying, on the receiving client, the representation of imagery content and the publishing control;
   suggesting one or more tags for the imagery content with the publishing control; and
   transmitting, using the receiving client, at least one instruction generated from the publishing control to publish the imagery content at a specified destination on the publishing host, wherein the at least one instruction includes the one or more tags.

2. The method of claim 1, wherein transmitting the at least one instruction generated from the publishing control to publish the imagery content includes enabling a user on the receiving client to select the representation of imagery content appearing in the electronic message and drag and drop the representation of imagery content to a representation of a gallery associated with a user on the publishing host.

3. The method of claim, 1 further comprising:
   enabling, on the receiving client, a user to create a rule with the publishing control that automatically classifies the imagery content in response to receiving the electronic message;
   enabling, on the receiving client, the user to associate a gallery with the rule with the publishing control; and
   automatically transmitting, using the receiving client, the at least one instruction generated from the publishing control to publish the classified imagery content into the gallery.

4. The method of claim 1, further comprising:
   enabling, on the receiving client, a user to create a rule with the publishing control that automatically classifies the imagery content in response to receiving the electronic message;
   enabling, on the receiving client, the user to associate a gallery with the rule with the publishing control;
   determining on the receiving client that the imagery content in the electronic message is responsive to the rule;
   presenting, on the receiving client, a suggestion control enabling the user to automatically publish the imagery content; and
   transmitting, using the receiving client, the at least one instruction generated from the publishing control to publish the imagery content in response to the user selecting the suggestion control.

5. The method of claim 1, wherein receiving the electronic message includes receiving an electronic mail message, an instant message, or a Multimedia Messaging Service (MMS) message.

6. The method of claim 1, wherein the publishing control is embedded in the received electronic message and the representation of imagery content is included in the electronic message by the messaging client.

7. The method of claim 1, wherein the at least one instruction includes notification instructions that transmits automatic electronic notification messages to other users associated with the specified destination after the imagery content is published on the publishing host.

8. The method of claim 1, further comprising modifying the imager content using the publishing control by tagging a caption to the imagery content, change settings of the image content, or both.

9. A method of publishing rich media content, the method comprising:
   forwarding, using a host, a received electronic message from a messaging client, that includes imagery content, to a receiving client;
   determining, on the host, that the receiving client has a publication capability on a publishing host, wherein the host provides communication separately from the publishing host;

enabling, using the host, the receiving client to select a representation of the imagery content;

presenting, using the host, a publishing control associated with the received electronic message based on the determination that the receiving client has the publication capability on the publishing host, wherein the publishing control allows for suggesting one or more tags for the imagery content;

receiving, using the host, a user instruction from the receiving client to publish the selected representation on the publishing host via the publishing control; and transmitting, using the host, the imagery content and instructions to enable other users to access the imagery content through a web browser at a user-specified destination on the publishing host.

10. The method of claim 9, wherein presenting the publishing control includes enabling a user to select the representation of the imagery content appearing in the received electronic message and moving the representation of the imagery content to a representation of a gallery associated with a user on the publishing host.

11. The method of claim 9, wherein presenting the publishing control includes:

detecting, by the host, the imagery content included in the received electronic message;

accessing, by the host, permissions associated with a user of the receiving client, fi a publishing service operated by the publishing host;

interfacing, based on accessing the permissions, with the publishing service;

identifying a gallery associated with the publishing service;

presenting a first representation of the gallery; and enabling the user to perform a first operation to add the representation of the imagery content to the gallery.

12. The method of claim 9, wherein the received user instruction is automatically generated from a rule created with the publishing control, and wherein the rule automatically classifies the imagery content into a gallery provided with the publishing host.

13. The method of claim 12, wherein a suggestion control associated with the publishing control enables a user to automatically generate the received user instruction.

14. The method of claim 9, wherein the electronic message includes an electronic mail message, an instant message, or a Multimedia Messaging Service (MMS) message.

15. The method of claim 9, further comprising receiving, on the host, the suggested tags from the user for the imagery content and transmitting, using the host, an electronic message that instructs the imagery content with the suggested tags.

16. The method of claim 9, wherein the publishing control is embedded in the received electronic message and the representation of imagery content is included in the electronic message by the messaging client.

17. The method of claim 9, wherein the instructions include notification instructions for transmitting electronic notification messages to subscribers of the user-specified destination of the publishing host.

18. The method of claim 9, wherein the publishing control provides a list of galleries that a user of the receiving client has access to post rich media content.

19. A system that publishes rich media content, the system comprising:

means for receiving, on a receiving client, an electronic message from a messaging host that comprises a representation of imagery content, wherein the electronic message is transported via a messaging host that provides communication independently from a publishing host;

means for obtaining, by the receiving client, a publishing control associated with the electronic message after checking that the receiving client has publishing capabilities on the publication host, wherein the publishing control enables transmission of the imagery content to a publishing host at a user-specified destination;

means for displaying, on the receiving client, the representation of imagery content and the publishing control;

means suggesting one or more tags for the imagery content with the publishing control; and means for transmitting, using the receiving client, at least one instruction generated from the publishing control to publish the imagery content at a user-specified destination on the publishing host, wherein the at least one instruction includes the one or more tags.

20. A system that publishes rich media content, the system comprising:

means for forwarding, using a host, a received electronic message from a messaging client, that includes imagery content, to a receiving client;

means for determining at the host that the receiving client has a publication capability on a publishing host, wherein the host communicates with the receiving client separately from the publishing host;

means for enabling, using the host, the receiving client to select a representation of the imagery content;

means for presenting, using the host, a publishing control associated with the received electronic message based on the determination that the receiving client has the publication capability on the publishing host, wherein the publishing control allows for suggesting one or more tags for the imagery content;

means for receiving, using the host, a user instruction from the receiving client to publish the selected representation on the publishing host via the publishing control; and means for transmitting, using the host, the imagery content and instructions to enable other users to access the imagery content through a web browser at a user-specified destination on the publishing host.

21. A system that publishes rich media content, the system comprising instructions on a non-transitory computer readable medium that when executed on a processor cause the system to:

receive, using a receiving client, an electronic message from a messaging client that comprises a representation of imagery content, wherein the electronic message is transported via a messaging host that provides communication independently from a publishing host;

obtain by the receiving client, a publishing control associated with the electronic message after checking that the receiving client has publishing capabilities on the publication host, wherein the publishing control enables the user to transmit the imagery content to the publishing host;

suggest one or more tags for the imagery content with the publishing control; and transmit, using the receiving client, at least one instruction generated from the publishing control to publish the imagery content at a specified destination on the publishing host, wherein the at least one instruction includes the one or more tags.

22. The system of claim 21, wherein the instructions, when executed by the processor, further causes the system to enable a user on the receiving client to select the representation of imagery content appearing the electronic message and move the representation of imagery content to a representation of a gallery associated with a user on the publishing host.

23. The system of claim 21, wherein the instructions, when executed by the processor, further causes the system to:
   enable, on the receiving client, a user to create a rule with the publishing control that automatically classifies the imagery content in response to receiving the electronic message;
   enable, on the receiving client, the user to associate a gallery with the rule with the publishing control; and
   automatically transmit, using the receiving client, the at least one instruction generated from the publishing control to publish the classified imagery content into the gallery.

24. The system of claim 21 wherein the instructions, when executed by the processor, further causes the system to:
   enable, on the receiving client, a user to create a rule with the publishing control that automatically classifies the imagery content in response to receiving the electronic message;
   enable, on the receiving client, the user to associate a gallery with the rule;
   determine on the receiving client that the imagery content in the message is responsive to the rule;
   present, on the receiving client, a suggestion control enabling the user to automatically publish the imagery content; and
   transmit, using the receiving client, the at least one instruction generated from the publishing control to publish the imagery content in response to the user selecting the suggestion control.

25. The system of claim 21, wherein receiving the electronic message includes receiving an electronic mail message, an instant message, or a Multimedia Messaging Service (MMS) message.

26. The system of claim 21, wherein the publishing control is embedded in the received electronic message and the representation of imagery content is included in the electronic message by the messaging client.

27. The system of claim 21, wherein the at least one instruction includes notification instructions that transmits automatic electronic notification messages to members with the specified destination when the imagery content is published on the publishing host.

28. The system of claim 21, wherein the instructions, when executed by the processor, further causes the system to modify the imager content with the publishing control by tagging a caption to the imagery content, change settings of the image content, or both.

29. A system that publishes rich media content, the system comprising instructions on a non-transitory computer readable medium that when executed on a processor cause the system to:
   forward, using a host, a message having associated imagery content;
   determine, at the host, that the receiving client has a publication capability on a publishing host wherein the host communicates with the receiving client separately from the publishing host;
   enable, using the host, the receiving client to select a representation of the imagery content;
   present, using the host, a publishing control associated with the received electronic message based on the determination that the receiving client has the publication capability on the publishing host, wherein the publishing control enables the user to designate, within the received message, the imagery content for publication to a user-specified destination on the publishing host, and wherein the publishing control allows for suggesting one or more tags for the imagery content;
   receive, using the host, a user instruction from the receiving client to publish the selected representation on the publishing host; and
   transmit, using the host, the imagery content and publishing instructions to enable other users to access the imagery content through a web browser at a user-specified destination to the publishing host.

30. The system of claim 29, wherein the instructions, when executed by the processor, cause the system to present the publishing control by enabling the user to select the representation of the imagery content appearing in the received electronic message and moving the representation of the imagery content to a representation of a gallery associated with a user on the publishing host.

31. The system of claim 29, wherein the instructions, when executed by the processor, cause the system to present the publishing control by:
   detect, by the host, the imagery content included in the received electronic message;
   access, by the host, permissions associated with a user of the receiving client, for a publishing service operated by the publishing host;
   interfacing, based on accessing the permissions, with the publishing service;
   identifying a gallery associated with the publishing service;
   presenting a first representation of the gallery;
   enabling the user to perform a first operation to add the representation of the imagery content to the gallery.

32. The system of claim 29, wherein the received user instruction are automatically generated from a rule created with the publishing control, and wherein the rule automatically classifies the imagery content into a gallery provided with the publishing host.

33. The system of claim 32, wherein a suggestion control associated with the publishing control enables a user to automatically generate the received user instruction.

34. The system of claim 29, wherein the electronic message includes an electronic mail message, an instant message, or a Multimedia Messaging Service (MMS) message.

35. The system of claim 29, wherein the instructions, when executed by the processor, further cause the system to receive the suggested tags from the user for the imagery content and transmit, using the host, an electronic message that instructs publishing the imagery content with the suggested tags.

36. The system of claim 29, wherein the publishing control is embedded in the received electronic message and the representation of imagery content is included in the electronic message by the messaging client.

37. The system of claim 29, wherein the publication instructions include notification instructions for transmitting electronic notification messages to subscribers of the user-specified destination of the publishing host.

38. The system of claim 29, wherein the publishing control provides a list of galleries that a user of the receiving client has access to publish rich media content.

* * * * *